United States Patent
Certuse, Jr.

(10) Patent No.: US 8,555,574 B2
(45) Date of Patent: Oct. 15, 2013

(54) PIPE INSULATION SYSTEM

(75) Inventor: John Certuse, Jr., Attleboro, MA (US)

(73) Assignee: Insulation Systems, LLC, Attleboro, MA (US)

( * ) Notice: Subject to any disclaimer, the term of this patent is extended or adjusted under 35 U.S.C. 154(b) by 39 days.

(21) Appl. No.: 13/235,938

(22) Filed: Sep. 19, 2011

(65) Prior Publication Data

US 2012/0023844 A1    Feb. 2, 2012

Related U.S. Application Data (63) Continuation-in-part of application No. 12/246,588, filed on Oct. 7, 2008, now Pat. No. 8,146,311.

(60) Provisional application No. 61/452,926, filed on Mar. 15, 2011.

(51) Int. Cl.
 *E04C 2/52* (2006.01)
 *E04C 1/00* (2006.01)
 *E04B 1/74* (2006.01)
 *E03B 7/10* (2006.01)

(52) U.S. Cl.
 USPC ....... 52/220.1; 52/407.3; 52/309.4; 52/404.4; 138/32; 237/80

(58) Field of Classification Search
 USPC ......... 52/95, 220.1, 220.3, 317, 406.1, 407.3, 52/220.2, 220.6, 309.4, 309.7, 404.4, 52/404.1, 404.5; 138/151, 32; 237/69, 80; 165/49
 See application file for complete search history.

(56) References Cited

U.S. PATENT DOCUMENTS

| | | | |
|---|---|---|---|
| 2,602,764 A * | 7/1952 | Billingham | 138/158 |
| 3,191,632 A | 6/1965 | Keiding | |
| 3,391,507 A * | 7/1968 | Downing | 52/314 |
| 3,479,779 A * | 11/1969 | Ziegler | 52/144 |
| 3,670,764 A | 6/1972 | Tindal | |
| 3,904,379 A | 9/1975 | Oser et al. | |
| 4,422,443 A * | 12/1983 | Arendt | 126/570 |
| 4,584,217 A | 4/1986 | McClintock | |
| 4,772,507 A | 9/1988 | Leo, Jr. et al. | |
| 4,967,799 A | 11/1990 | Bradshaw et al. | |
| 5,007,222 A | 4/1991 | Raymond | |
| 5,123,453 A | 6/1992 | Robbins | |
| 5,192,039 A | 3/1993 | Williams | |
| 5,381,833 A | 1/1995 | Cummings et al. | |
| 5,408,990 A * | 4/1995 | Edling et al. | 126/683 |

(Continued)

FOREIGN PATENT DOCUMENTS

| | | |
|---|---|---|
| DE | 202006011374 U1 | 10/2006 |
| EP | 0551640 A1 | 12/1992 |

*Primary Examiner* — Ryan Kwiecinski
(74) *Attorney, Agent, or Firm* — Barlow, Josephs & Holmes, Ltd.

(57) ABSTRACT

A modular shell system of a hard insulation material fabricated in a geometric shape that encapsulates a pipe in insulation is provided. In an attic installation for example, the entire insulation component is inserted over a pipe and into the space between the building structural wood framing members resting on the interior sheathing below. By placing a series of these interlocking insulating modules along a pipe that is run perpendicular to the building construction members, the piping is encapsulated in a continuous insulating system along its entire length. This design facilitates natural heat flow into the pipe with an open pipe slot cavity in the insulating module that allows natural convection heat to pass up through the elongated piping slot, allowing it to come into contact with this piping.

5 Claims, 10 Drawing Sheets

(56) References Cited

U.S. PATENT DOCUMENTS

| | | | |
|---|---|---|---|
| 5,427,849 A | 6/1995 | McClintock et al. | |
| 5,601,894 A * | 2/1997 | Maruschak | 428/36.9 |
| 6,000,420 A | 12/1999 | Nicholson et al. | |
| 6,016,846 A | 1/2000 | Knittel et al. | |
| 6,128,884 A * | 10/2000 | Berdan et al. | 52/742.12 |
| 6,196,272 B1 | 3/2001 | Davis et al. | |
| RE37,279 E | 7/2001 | Fisher et al. | |
| 6,460,576 B2 | 10/2002 | Vitoorapakorn | |
| 7,650,911 B2 * | 1/2010 | Follett et al. | 138/108 |
| D667,350 S * | 9/2012 | Smith | D12/162 |
| 2003/0056451 A1 | 3/2003 | Plsek et al. | |
| 2003/0218075 A1 | 11/2003 | Muir | |
| 2004/0026525 A1 * | 2/2004 | Fiedrich | 237/69 |
| 2004/0040693 A1 | 3/2004 | Fiedrich | |
| 2005/0188632 A1 * | 9/2005 | Rosen | 52/220.2 |
| 2007/0107364 A1 * | 5/2007 | Estes et al. | 52/606 |
| 2008/0104913 A1 * | 5/2008 | Messenger et al. | 52/309.9 |
| 2009/0019802 A1 * | 1/2009 | Crall, Jr. | 52/404.3 |
| 2009/0113820 A1 | 5/2009 | Deans | |
| 2010/0011699 A1 * | 1/2010 | Weimer et al. | 52/745.1 |
| 2010/0083600 A1 * | 4/2010 | Certuse, Jr. | 52/407.3 |
| 2012/0096785 A1 * | 4/2012 | Weeks | 52/220.1 |

* cited by examiner

PIPE INSULATION SYSTEM

CROSS-REFERENCE TO RELATED APPLICATIONS

This application is a continuation-in-part and claims priority from earlier filed U.S. Utility application Ser. No. 12/246,588, now U.S. Pat. No. 8,146,311, filed Oct. 7, 2008 and US Provisional Patent Application No. 61/452,926, filed Mar. 15, 2011.

BACKGROUND OF THE INVENTION

The present invention relates generally to a method and system for insulating piping. More specifically, the present invention relates to a method and system for effectively insulating piping located in an exterior wall construction in a manner that protects the piping from freezing.

Figure 1:
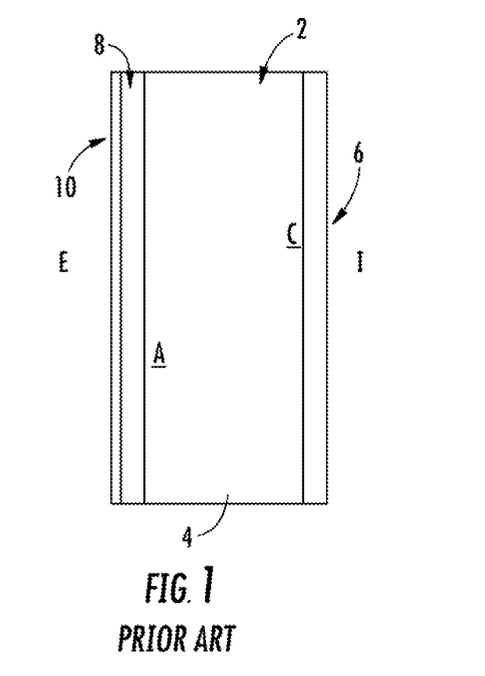
FIG. 1 is cross-sectional side view of prior art wall construction and the heat distribution therethrough.

In the construction of residential and commercial structures a variety of piping systems are installed to allow delivery of water to various plumbing fixtures such as sinks and toilets. Further, hydronic piping is installed to circulate a fluid medium, which is some cases is simply water, to effect heat transfer in order to heat the space. Often, due to the design of the space or the location of the various fixtures and heating elements, such piping must be located adjacent or within the cavity of the exterior walls of the structure. The difficulty created in these instances is that during the winter the temperature outside the wall construction and often within the wall cavity itself fall below 32° F., the freezing point of the water contained within these piping systems. When examined closely, the heat profile of a typical wall construction can be seen to have temperatures approaching the interior ambient temperature at the inner surface of the drywall within the wall bay and temperatures approaching exterior cold temperatures at the inner surface of the exterior sheathing within the same wall bay. Turning to FIG. 1, a typical wall construction can be seen having a wall cavity 2 filled with R-19 insulation 4 sandwiched between drywall 6 on the interior surface and plywood 8 and shingles 10 on the exterior surface. Given an interior ambient temperature of 70° F. and an exterior condition of 5° F. with a 15 MPH wind the temperature of profile within the wall cavity 2 can be seen to reach as low as 9.93° F. at the interior surface of the exterior sheathing 8. While theoretically the piping can be protected from freezing provided that it is positioned on the interior half of the wall where temperature can he seen to be above 38° F., actual practice does not always meet the theoretical design requirements as will be discussed below.

Since it is well recognized that the space in the wall cavity of an exterior wall can often reach freezing temperatures, the International Plumbing Code and most state plumbing codes provide a basic requirement that domestic water pipes installed in outside walls shall be protected from freezing either by heat, insulation or both. One issue with such code provisions, however, is the fact that the code does not provide any specific direction as to how such protection against freezing should be provided. Further, while these code provisions apply to domestic water supplies, the difficulty arises in that the parallel code relating to heating systems has not provided any requirements regarding the protection of hydronic piping from freezing. This situation is further aggravated because the lack of direction a code level has translated directly into a lack of industry support for the installation of insulation on hydronic piping in exterior walls. As a result, there have been a large number of pipe failures directly tied to the freezing of the piping installed in exterior walls, wherein the pipe failure has caused extensive building damage. It has been reported that building damage due to frozen pipes is second in the United States only to hurricane damage.

Figure 2:
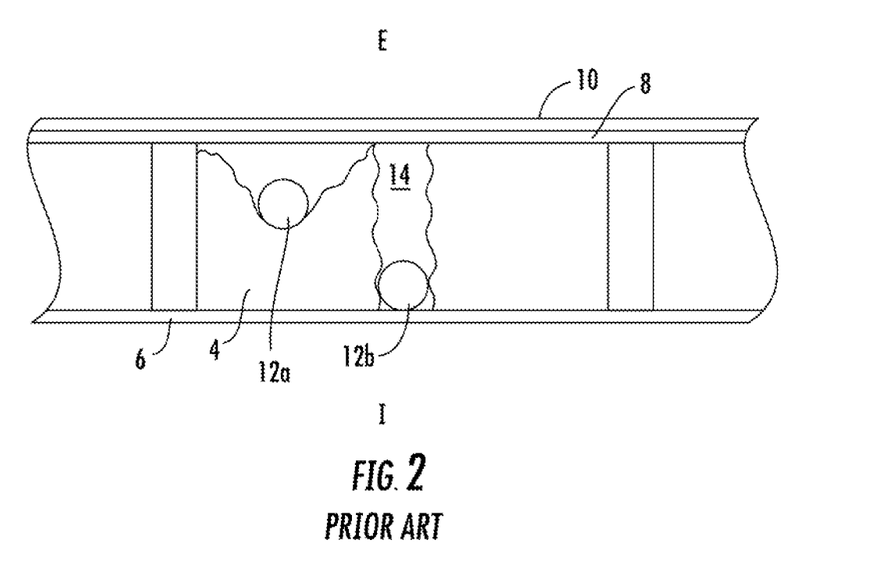
FIG. 2 is a cross-sectional plan view of prior art wall construction including piping installed therein.

Turning to FIG. 2, generally, in the prior art, installers simply provide for the installation of their piping into the wall cavity prior to the installation 4 of the building envelope. The installers then rely on the installer of the building insulation 4 to tuck the insulation material behind their piping thereby theoretically positioning the piping on the interior/warm side of the insulation 4 where it should be protected against freezing in most cases. While in theory such a practice should work, in most cases the actual installation does not comport with the theoretical ideal. For example, the installer of the insulation 4 may find it easier to install the insulation 4 over the top of the piping as shown at reference 12a leaving the piping 12a on the cold side of the insulation 4. Further, the installer may simply stop the insulation on either side of the piping as shown at reference 12b leaving a gap 14 that directly exposes the piping 12b to the cold side of the wall.

One insulation technique, known as "tenting" is one where batting insulation is draped over pipes that are run through unheated building cavities/attic spaces. The draped shape of the fiberglass (or similar) batting insulation is an attempt to prevent pipes installed in unheated building cavities from freezing. Part of the problem with this methodology is that the batting insulation that is used is not intended for this particular application. When draped over the pipe it becomes compressed, reducing its insulation value. Also, by creating a large building void space, this defeats the Energy Conservation Code, as well as Energy Star Guidelines, for building construction, and additionally creates large air spaces within building cavities that can lead to condensation, as well as mold growth. Also, freezing often occurs in pipes insulated in this manner due to inadvertent contact by building occupants, wind, or even animal contact which dislodges this insulation allowing cold draft contact.

A typical piping installation practice is for pipes to be placed on top of 2×6, 2×8, or 2×10 building construction members in an unheated attic when fire protection sprinkler systems are installed. When this piping arrangement cannot be modified and the possibility of passing this piping through these members by drilling a hole is not desirable for the installer, still, a methodology needs to be applied to protect this piping from freezing.

There are a number of different pipe insulation products that are currently available on the market today. Such insulation is generally configured as a pipe wrap in the form of jacketed fiberglass or a rubber material. These materials are installed fully around the exterior surface of the pipe thereby insulating the pipe. The problem that most people do not appreciated about the prior art insulation is that they are designed to prevent heat loss from the interior of the pipe to the exterior of the pipe. In other words they are intended to maintain the interior temperature of the fluid within the pipe. These insulation materials are not designed to address piping installed in locations for a long time that do not contain heated or moving water and this insulation is only intended to satisfy the requirements of the International Energy Conservation Code in reducing energy losses.

There is therefore a need for a method and system for insulating piping that is installed in attic locations servicing fixtures in the ceiling or spaces below. There is a further need for a method and system of insulating piping, such as wet sprinkler pipes in ceiling construction that reliably insures that the piping is protected from freezing by insuring that the piping is maintained as near to the ambient temperature of the interior of the structure as possible.

BRIEF SUMMARY OF THE INVENTION

In this regard, the present invention provides a method and system that, as opposed to the tenting method described above, incorporates a modular shell system of a hard insulation material, such as polystyrene. The intention of this design is to provide individual pieces of polystyrene fabricated in a geometric shape that encapsulates the pipe in insulation. In an attic installation for example, the entire insulation component is inserted over the pipe and into the space between the building structural wood framing members resting on the interior sheathing below. By placing a series of these interlocking insulating modules along a pipe that is run perpendicular to the building construction members, the piping is encapsulated in a continuous insulating system along its entire length. An intended feature of this design is to facilitate natural heat flow into the pipe in a manner similar to my original design with an open pipe slot cavity in the insulating module that allows natural convection heat to pass up through the elongated piping slot, allowing it to come into contact with this piping.

This design provides a modular system that is more resilient and is less prone to displacement by inadvertent contact. Through the use of this system a more effective insulating system can be installed in comparison to present standard practice of trade even if pipes cannot be installed in the more desirable position directly against a building's interior sheathing.

The system of the present invention provides for an insulation block that is dimensioned particularly for installation into a building ceiling construction. The insulation block has an interior side and an exterior side and a slot formed therein for receiving a pipe to be insulated. More particularly, the thickness of the insulation block is configured to match the dimensions of standard framing members wherein the slot for receiving the piping allows for the piping to be installed immediately adjacent the top/back surface of the ceiling framing members.

Accordingly, it is an object of the present invention to provide a method and system for insulating piping that is specifically configured and designed for applications in ceiling construction where the pipes are prone to freezing. It is a further object of the present invention to provide a method and system of insulating piping, such as sprinkler piping in ceiling construction that reliably insures that the piping is protected from freezing by insuring that the piping is maintained as near to the ambient temperature of the interior of the structure as possible. It is still a further object of the present invention to provide a system for insulating piping that reliably positions an uninterrupted thickness of insulation material behind the piping such that the insulation material is positioned between the piping and the exposed attic environment while including a heat transfer cavity to facilitate heat transfer from the interior of the building and into the piping.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Now referring to the drawings, method and system for insulating piping installed in an exterior wall is generally shown and illustrated. As was stated above, the present invention generally provides an improved method and system for effectively insulating piping located in an exterior wall or ceiling construction in a manner that protects the piping from freezing.

Figure 3:
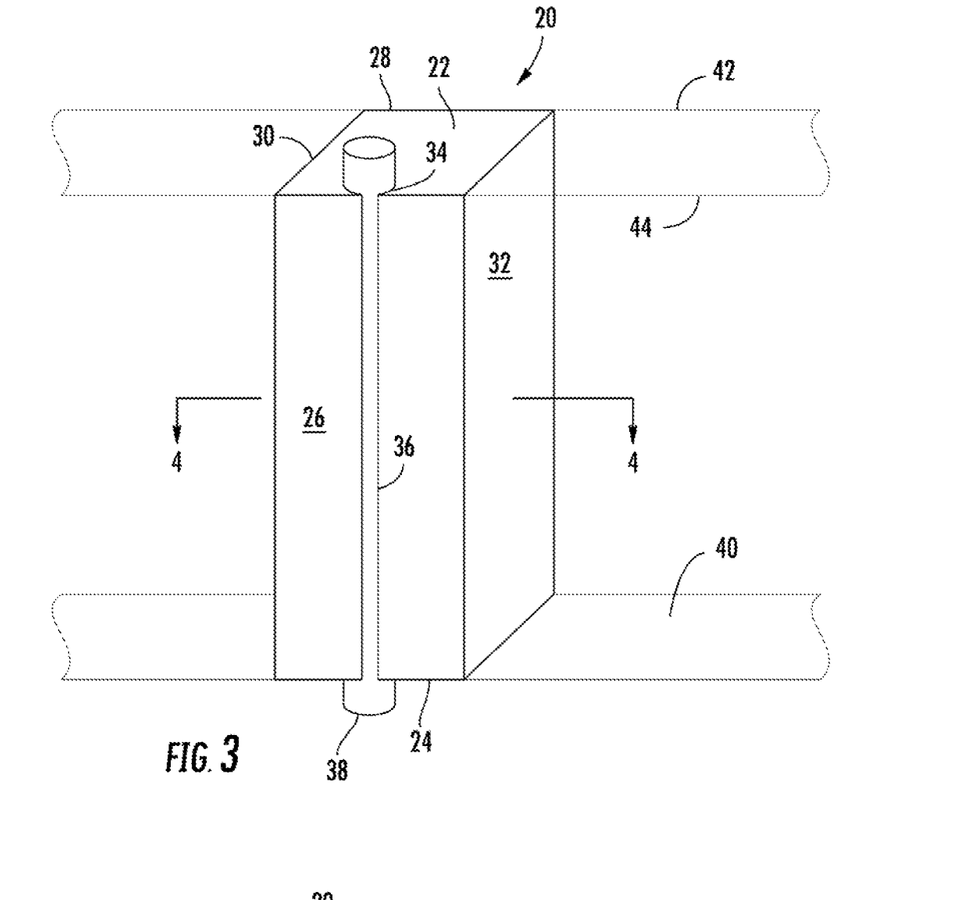
FIG. 3 is a front, perspective view of the insulation system of the present invention.

Turning to FIG. 3, it can be seem that in its most general form, the system of the present invention provides for an insulation block 20 that is dimensioned particularly for installation into a building wall cavity. The insulation block 20 is generally regular in cross-section and is longitudinal extending from a proximal end 22 to a distal end 24. The insulation block 20 includes a front surface 26, a rear surface 28 and two side surfaces 30, 32 that all extend along a length of the insulation block 20 between the proximal 22 and distal 24 ends. The insulation block 20 can be seen to include at least one cavity 34 formed therein. It is preferred that the cavity 34 be formed in the insulation block 20 proximate the front surface 26 and that the cavity 34 extend along the length of the block 20 from the proximal end 22 to the distal end 24. In addition to the cavity 34, a slot 36 can be seen extending between the front surface 26 of the insulation block 20 and the cavity 34 formed therein. In operation, the cavity 34 in the insulation block 20 is configured to receive a pipe 38 therein such that a portion of the pipe 38 is exposed adjacent the front surface 26 of the insulation block 20.

The width or diameter of the cavity 34 is preferably the same size as that of the piping 38 to be received therein while the slot 36 is preferably narrower in width than the width/diameter of the cavity 34. This allows the piping 38 to be wrapped nearly fully by the insulation block 20 while leaving a space for the piping 38 to contact the rear surface of the interior sheathing.

It should be appreciated by one skilled in the art that while the insulation block 20 of the present invention is shown to be rectangular, such a profile was chosen for expediency and efficient use of material and extrusion equipment, any other profile shape may also be used and still fall within the scope of the present disclosure. Similarly, as will be descried below, the cavity 34 extends nearly entirely around the outer surface of the pipe 38 received therein leaving only a small exposed region of the piping 38 to be in contact with the rear surface of the interior sheathing. However, the cavity 34 may be formed to be square or U-shaped and still fall within the scope of the present disclosure.

Figure 4:
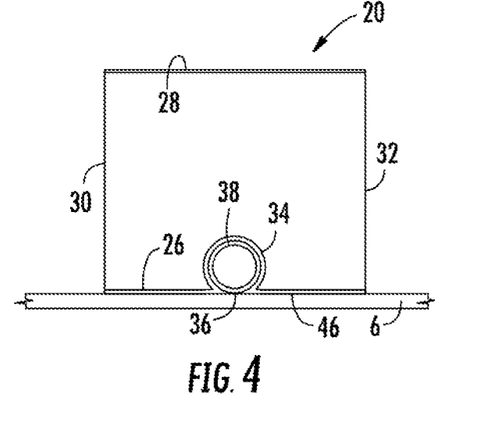
FIG. 4 is a cross-sectional view taken along line 4-4 of FIG. 3.

Turning now to FIG. 4 in conjunction with FIG. 3, the insulation block 20 of the present invention is configured for installation into an exterior wall structure having a cavity therein. As is well known in the art and as described above in FIGS. 1 and 2, such cavities 40 within exterior wall structures are formed as the space between exterior sheathing 42 and interior sheathing 44 and as such the cavity 40 has a warm side and a cold side. In operation, the insulation block 20 of the present invention is installed into the cavity 40 such that the rear surface 28 of the insulation block 20 is received adjacent the cold side of the cavity and the front surface 26 is received the warm side. As a result, it can also be seen that the pipe 38 received within the insulation block 20 is necessarily positioned adjacent the warm side of the cavity 40 as well. In this manner, the insulation block 20 provides an insulation system that positions the pipe 38 installed in the exterior wall in a predictable position that approximates the same plane as that plane against which the building's interior sheathing 44 will be secured.

Figure 4A:
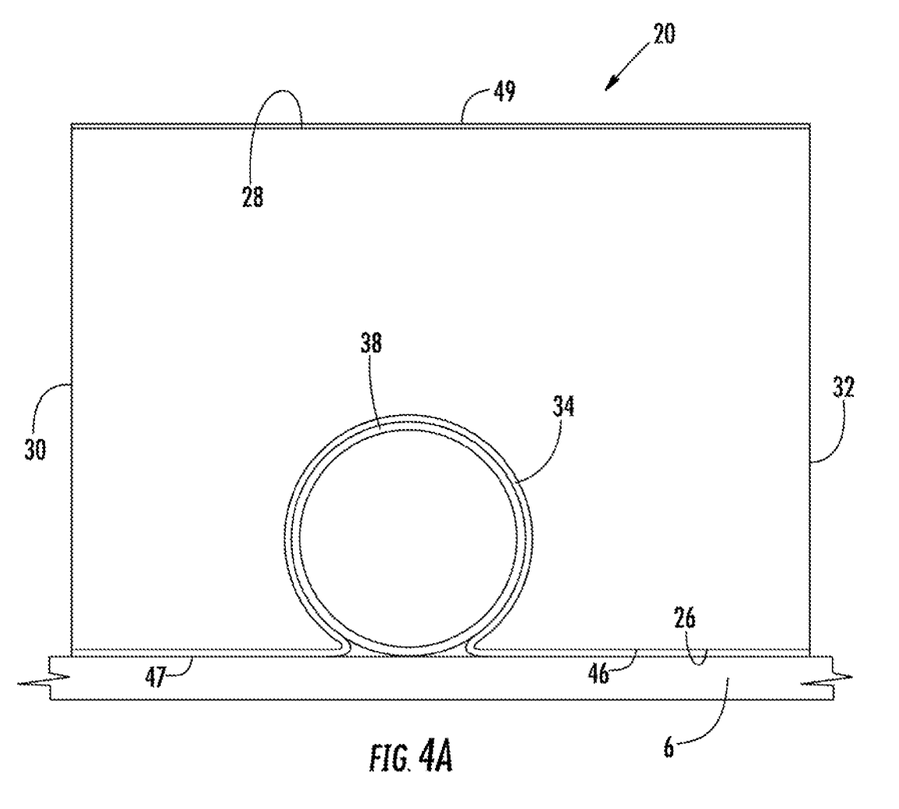
FIG. 4A is a zoomed in view of FIG. 4

As can be appreciated, the operative principal of the present invention is to facilitate heat transfer from the interior of the building and into the piping 38 to prevent freezing thereof. To enhance the overall ability of the insulation system to transfer heat into the piping 38 contained within the cavity 34, the insulation block 20 may also include a continuous thermally conductive layer 46 that covers the interior surface of the cavity 34, the slot 36 and at least a portion of the front surface 26 of the insulation block 20 proximate the slot 36. Similarly, the thermally conductive layer 46 may extend fully over the front surface 26 of the insulation block 20, although preferably, the thermally conductive surface 46 will end approximately ½ inch from the edge of the front face 26 of the insulation block 20 to prevent cold from being conducted into the pipe 38 at the edge of the contact surface. Preferably, the thermally conductive layer 46 is a metallic layer such as a metallic tape. It is still more preferable that the thermally conductive layer 46 includes an adhesive layer thereon. By providing an adhesive layer on the thermally conductive layer 46, the present invention insures a firm contact between the outer surface of the pipe 38 and the thermally conductive layer 46 in order to increase the heat transfer flow into the pipe 38. In this manner, the present invention employs a directional insulation technique wherein heat is selectively projected or converged into a desired area while heat loss is effectively prevented. In this manner the focused heat improves both the heat transfer efficiency (in hydronic piping) and to make use of heated sources such as an interior wall adjacent a heated space to protect a pipe from freezing in a susceptible area. As a result, the directional insulation concept makes maximum use of the building's interior heat by diverting this heat source into the piping allowing the piping to be heated without the use of an external (i.e. electrical resistance heating) heat source.

In addition to providing adhesive on the thermally conductive layer 46, it can be appreciated that the insulation block 20 may include adhesive 49 on a rear surface 28 thereof such that the insulation block 20 can be adhered to the interior surface of the exterior wall sheathing 42 when the insulation block 20 is installed. Similarly, the front surface 26 may include an adhesive layer 47 that adheres to the rear surface of the interior wall sheathing 44 as it is installed.

Figure 5:
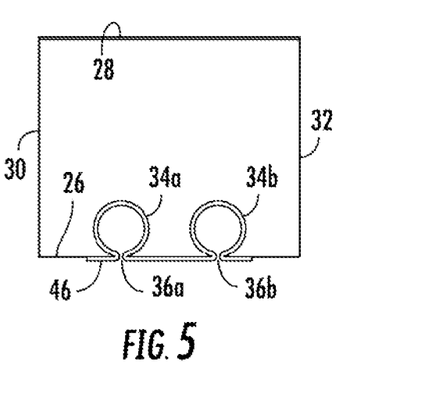
FIG. 5 is a cross-sectional view reflecting an alternate embodiment.

While the previous figures show a single cavity 34 and slot 36 formed in the insulation block 20, it can be seen in FIG. 5 that the teachings of the present invention are expandable to include a plurality of cavities 34a, 34b and slots 36a, 36b to accommodate multiple water supply pipes or a hydronic supply and return line for example. In this regard, two slots 36a, 36b adjoining two cavities 34a, 34b within the insulation block 20 are shown. Further, the teachings are scalable to any plurality of slots and cavities.

The construction of the insulation block 20 in the preferred embodiment consists of an extruded square block of Polystyrene with an R-value of between 5 and 6.5 per inch with outside dimensions that are slightly wider than the wall construction into which the insulation block 20 will be installed although any type of material known in the art would be equally applicable and fall within the scope of the present invention. In this manner, the width of the block 20 will be on the order of $1/16^{th}$ to $1/8^{th}$ of an inch larger than the width of the framing member used in constructing the wall cavity 40, allowing the insulation block 20 to be compressed as the interior sheathing 44 is installed thereby maintaining the piping in firm contact with the rear surface of the interior sheathing 44. In this manner the insulation block 20 is in compression between the interior sheathing 44 and the exterior sheathing 42 and is adhered thereto by the layers of adhesive to improve the installation process, increase the conductive heat transfer and eliminate the possibility of cold air infiltration reaching the piping. Should the insulation block 20 need to installed into a wall cavity 40 where the piping 38 is already installed and unmovable, the block 20 may be formed in two pieces as required to facilitate installation. For example, the block 20 may be formed as a front and back half wherein the front piece is installed around the piping 38 and the back half is then slid in behind. The compression of the block 20 within the wall cavity 40 negates any possibility of insulation inconsistency.

Figure 6:
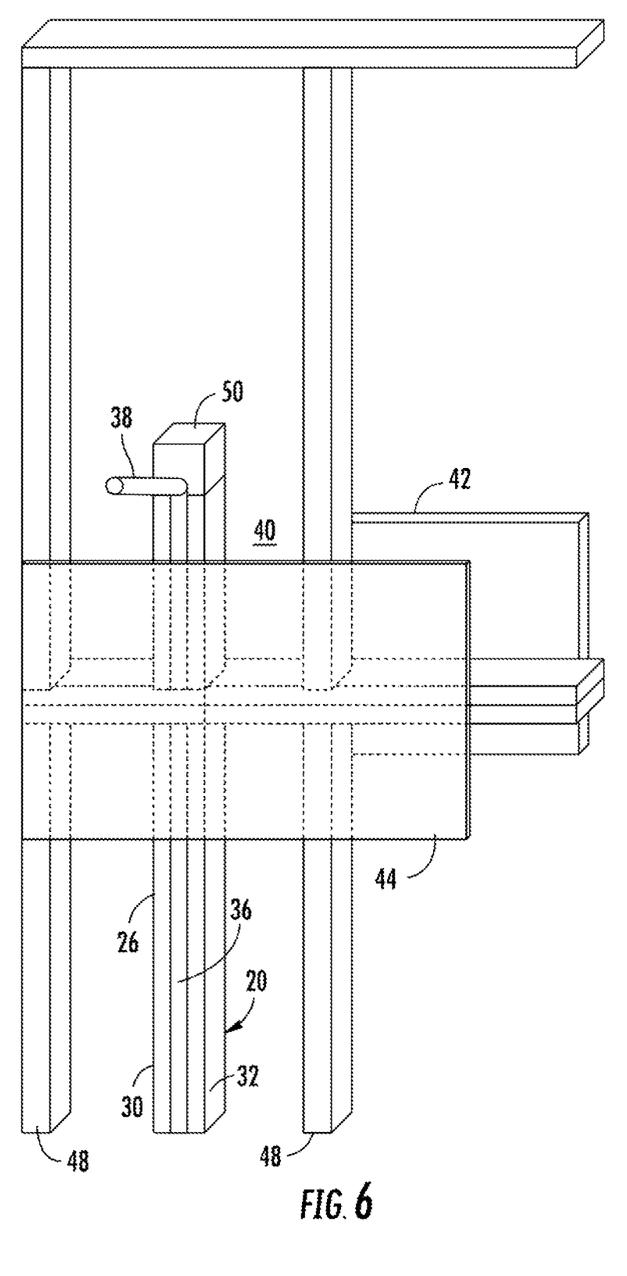
FIG. 6 is a perspective view of the insulation system of the present invention installed into a wall framing system.

FIG. 6 depicts the insulation block 20 of the present invention in an installed location in relation to an exterior wall structure. The exterior wall structure is formed to include a plurality of spaced apart framing members 48 wherein the framing members 48 support exterior sheathing 42 on one side and interior sheathing 44 on an opposing side thereof. The framing members 48, interior sheathing 44 and exterior sheathing 42 all cooperate to form a cavity 40 therebetween such that the cavity 40 has a warm side adjacent the interior sheathing 44 and a cold side adjacent the exterior sheathing 42. The insulation block 20 is received within the cavity 40 with the rear surface 28 adjacent the exterior sheathing 42 and the front surface 26 adjacent the interior sheathing 44 such that the slot 36 with said piping 38 therein is at least partially open to the rear surface of the interior sheathing 44.

As stated above, the insulation block 20 has a width that is slightly greater than the width of the framing members 48 into which it is installed. In 2×4 construction for example where the framing members 48 are 3-½" wide, the insulation block 20 will have a width that is on the order of about 3-9/16" to about 3-5/8". Similarly, in 2×6, where the framing members 48 are 5-½" the insulation block 20 will have a width that is on the order of about 5-9/16" to about 5-5/8". In this manner, the thickness of the insulation block 20 is configured to match the dimensions of standard framing members 48 wherein the slot 36 for receiving the piping 38 insures that the piping 38 is positioned immediately adjacent the back surface of the interior sheathing 44 material. As a result, the insulation system of the present invention protects the piping 38 in two ways.

First, the insulation block 20 reliably provides a thickness of insulation material behind the piping 38 such that the insulation material is positioned between the piping and the exterior wall surface. Second, the insulation maintains the piping 38 in contact with the rear surface of the interior wall sheathing 44 to facilitate heat transfer from the interior of the building and into the piping 38.

As stated above, the rear surface 28 of the insulation block 20 includes a tape covered adhesive surface allowing the block 20 to be stuck to the inner surface of the wall's outer sheathing 42 allowing stabilization and securing of the insulation block 20 during the construction phase of the building. As can be further seen in FIG. 6, intersection blocks 50 will be provided to allow the insulation system to be continuous from where it enters the wall to where it exits the wall through a 90 degree turn preventing any portion of the piping 38 from being out of this insulated system. As is standard in the industry, typical fiberglass, cellulose or loose fill insulation will be applied to the remaining spaces within the cavity 40.

To facilitate installation of the insulation blocks of the present invention, a template tool may be provided in order to locate the proper location in the wall for the drilling of penetration holes and the installation of the piping. In this manner, a template showing the location of the hole to be drilled in the sill (2×4 or 2×6) members of the wall will facilitate correct installation of the piping to allow later installation of the insulation block.

Turning now to FIGS. 7-10 an alternate embodiment of the present invention is provided for use in ceiling constructions and in particular for use in insulating piping that installed on top of the framing members employed to support the ceiling construction. This embodiment is configured for installation over a pipe that is supported on top of ceiling joists. Typically in such a construction, the ceiling includes spaced apart joists with sheathing material supported therebeneath. When piping is supported on top of the ceiling joists a cavity exists between the piping and the back side of the sheathing. Such an arrangement places the piping at a fair distance from the heat of the interior envelop and greatly increases the risk of freezing.

Figure 7:
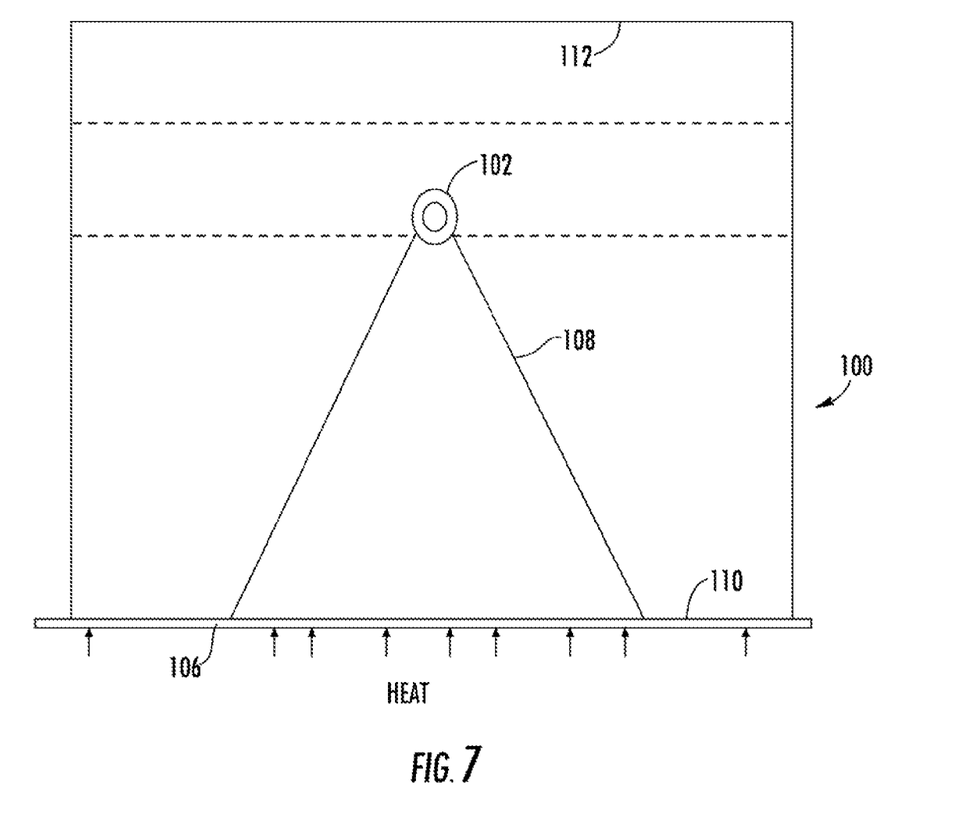
FIG. 7 is a cross-sectional view of an alternate embodiment insulation system in accordance with the teachings of the present invention.
Figure 8:
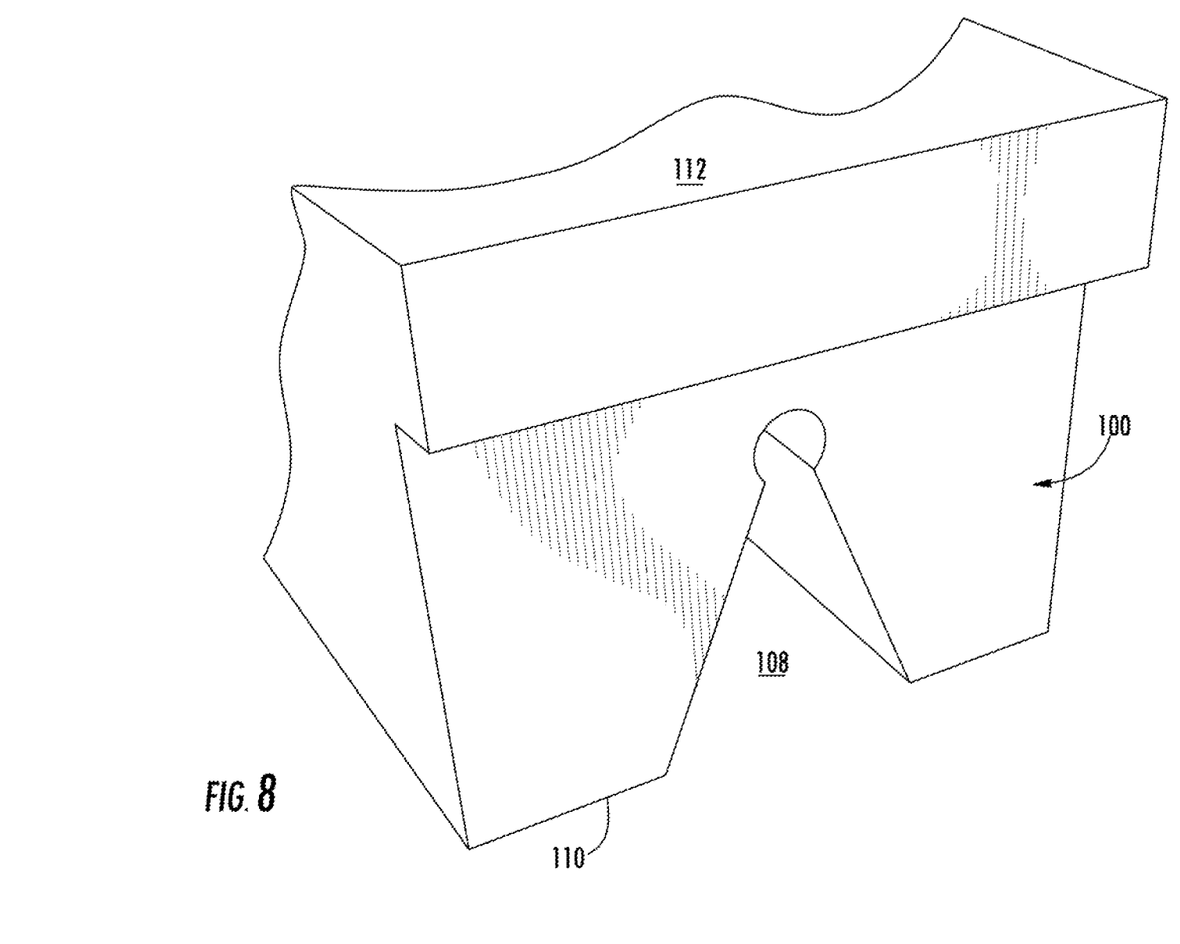
FIG. 8 is a perspective view of a modular insulation block employed in FIG. 7.
Figure 9:
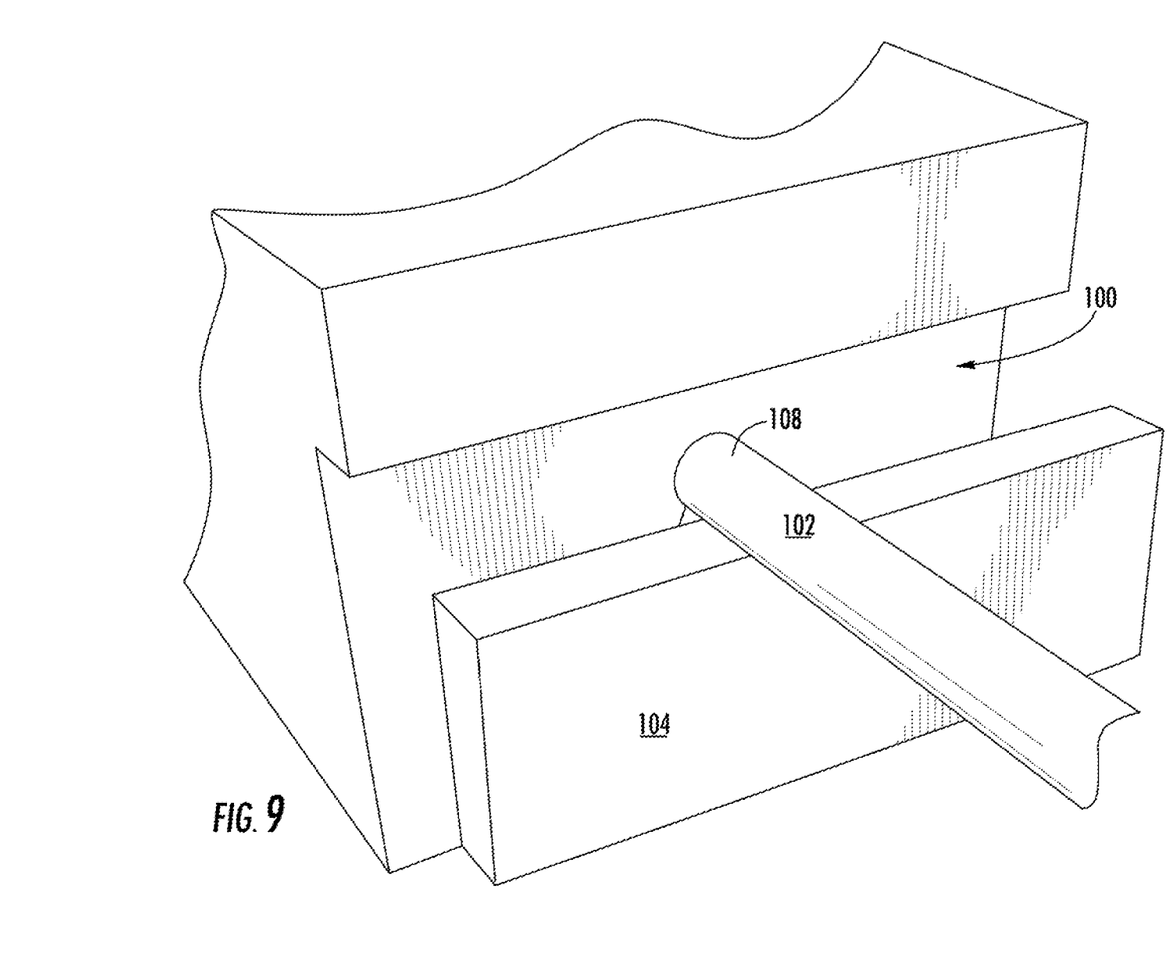
FIG. 9 is a perspective view of the modular insulation block employed in FIG. 7 installed over a pipe and adjacent a ceiling joist.

This embodiment provides individual modular insulation blocks 100 fabricated in a geometric shape that encapsulates the pipe 102 in insulation. In an attic installation for example, the entire modular insulation block 100 is inserted over the pipe 102 and into the space between the ceiling joists 104 such that the insulation block 100 rests on the rear surface of the interior sheathing 106 below. By placing a series of these interlocking insulating blocks 100 between each of the spaced apart framing members 104 and along a pipe 102 that runs perpendicular thereto, the piping 102 is encapsulated in a continuous insulating system along its entire length. Further, the insulation blocks 100 include a slot 108 formed therein that allows natural convection heat to pass up through the elongated piping slot, allowing it to come into contact with this piping 102.

This design provides a modular system for attic installations that is more resilient and less prone to displacement by inadvertent contact. This embodiment provides for an insulation block 100 that is dimensioned particularly for installation into a building ceiling construction. The insulation block 100 has an interior side 110 and an exterior side 112 and a slot 108 formed therein for receiving a pipe 102 to be insulated. More particularly, the thickness of the insulation block 110 is configured to match the dimensions of standard framing members wherein the slot 108 for receiving the piping 102 allows for the piping to be installed immediately adjacent the top/back surface of the ceiling framing members 104 while providing sufficient insulation behind the cold side of the pipe to prevent freezing In operation, the insulation block 100 of the present invention is installed around the pipe 102 and into the cavity between the joists 104. It can also be seen that the pipe 102 is received within the insulation block 100 and is necessarily positioned adjacent the warm side of the cavity. The block includes an opening 108 that extends up to and adjacent the rear surface of the ceiling sheathing 106 such that the opening 108 facilitates heat transfer through the sheathing 106 and into the opening 108 to prevent freezing of the piping 102 contained therein. More preferably the opening is wider where it is adjacent the sheathing. Still more preferably the opening is wedge shaped so as to focus any heat captured as it passes through the sheathing onto the pipe contained therein.

As can be appreciated, the operative principal of the present invention is to facilitate heat transfer from the interior of the building and into the piping 102 to prevent freezing thereof. To enhance the overall ability of the insulation system to transfer heat into the piping 102 contained within the cavity 108, the opening in the insulation block is preferably wider at the point where it contacts the rear surface of the sheathing to allow it to collect and focus heat onto the pipe contained therein. The block 100 may also include a continuous thermally conductive layer as described and illustrated previously that covers the interior surface of the cavity and at least a portion of the front surface of the insulation block proximate the slot. Similarly, the thermally conductive layer may extend fully over the front surface of the insulation block 100, although preferably, the thermally conductive surface will end approximately ½ inch from the edge of the front face of the insulation block 100 to prevent cold from being conducted into the pipe 102 at the edge of the contact surface. Preferably, the thermally conductive layer is a metallic layer such as a metallic tape.

Figure 10:
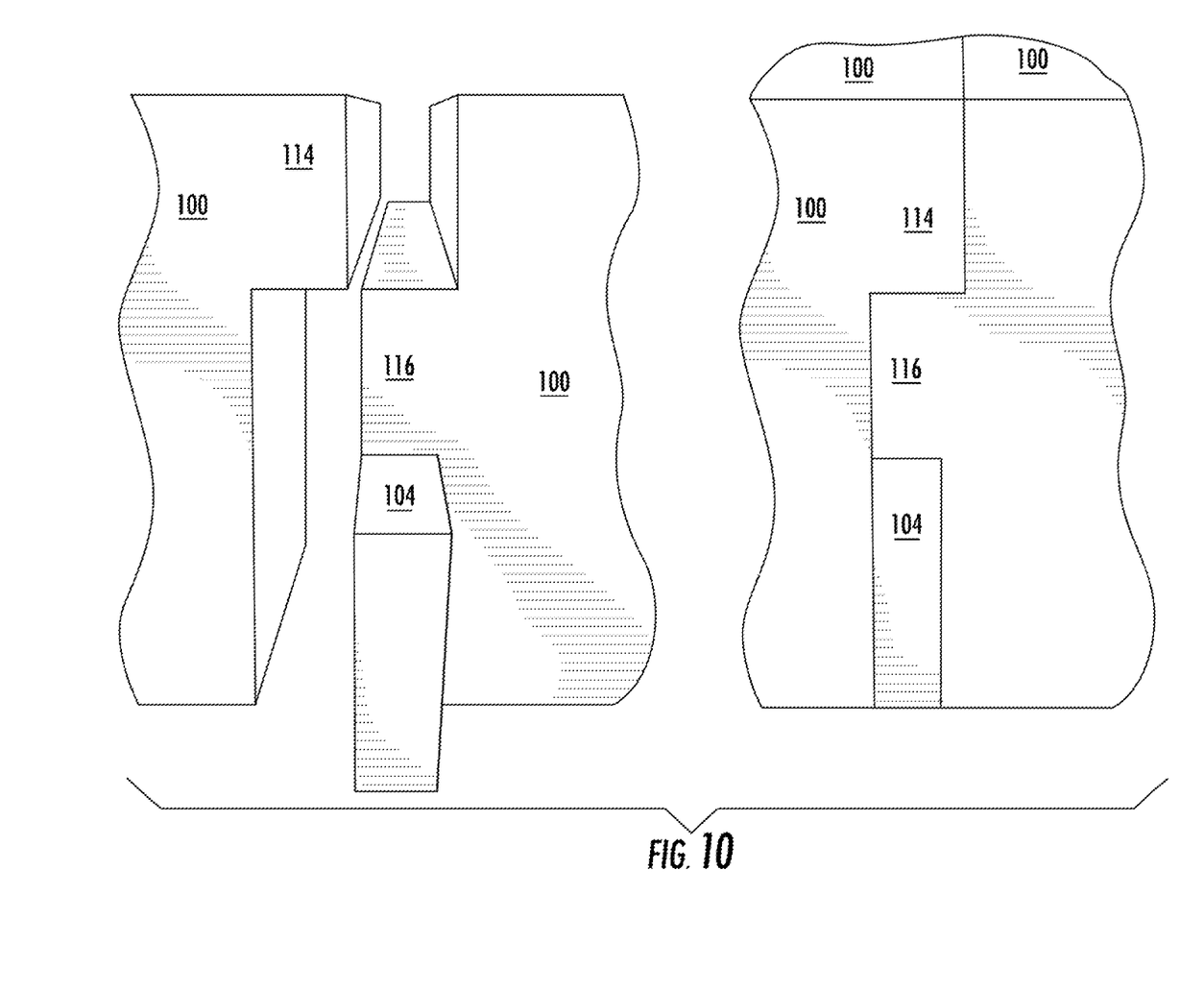
FIG. 10 illustrated a joint condition wherein two adjacent modular insulation blocks meet.

As can best be seen in FIG. 10, where adjacent insulation blocks 100 meet one another over the rear surface of the joists 104, the insulation blocks 100 will include complementary mating formations that work together to fully cover the pipe as it crosses over the joist. Preferably the complementary formations are an upper 114 and lower 116 flange that when installed serve to stagger the joint in the insulation block where it overlies the pipe to prevent the possibility that a direct gap in the insulation occurs over the piping itself.

In the "take off" piping lengths between the branch lines and each individual sprinkler head, an insulating "tenting" module having a larger opening therein to accommodate the branch lines and sprinkler drops is placed over the sprinkler head and connecting piping and interface with the insulating system covering the branch line piping. It is possible that this particular sprinkler head insulating module may also be capable of being modified by allowing the installation of a porous "screen like" decorative covering over each sprinkler head pendant, which will facilitate and allow a more natural flow of heated building air into the cavity containing the sprinkler head and "take off" piping connecting it to each individual branch line. Essentially, this "Sprinkler Head Tenting Shell" is doing the same thing as the other insulation listed above; however, this is specifically modified to address the sprinkler head piping connecting to each individual branch line.

Figure 11:
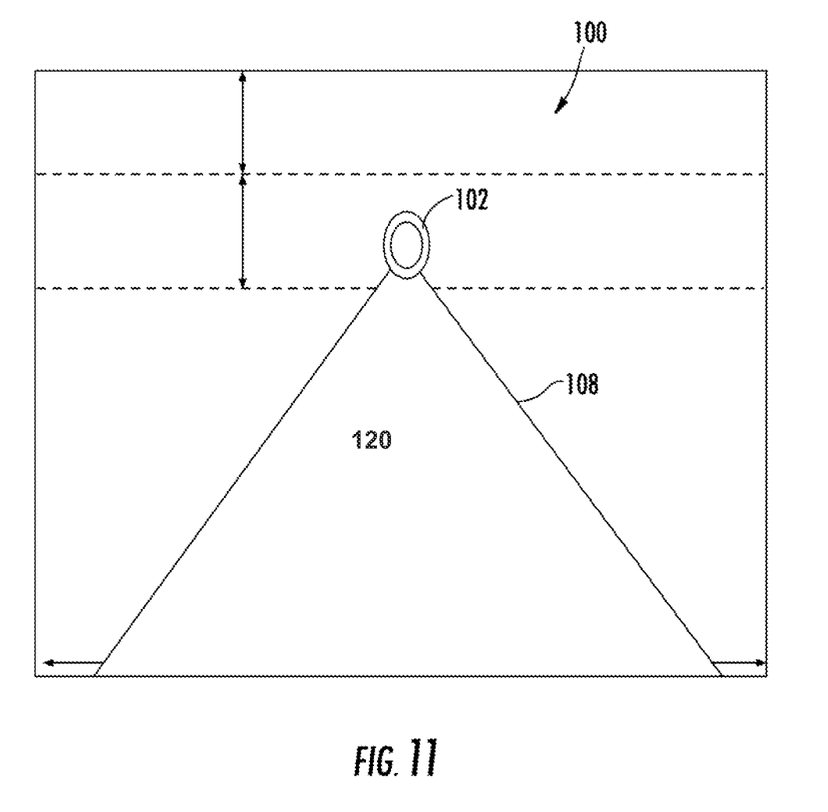
FIG. 11 is a cross-sectional view of a modular insulation block further including an anti-condensation feature.

In FIG. 11 an additional embodiment is shown wherein the insulation block 100 includes a further anti-condensation feature. In this arrangement is it known that should warm humid air contact the outer surface of a colder pipe, condensation occurs resulting in well document issues within building envelopes. To prevent condensation, a thin insulation strip 120 is shown installed on the warm side of the cavity 108 adjacent the pipe 108. This strip 120 is not enough insulation to prevent heating of the pipe, but is sufficient to maintain a barrier between a cold outer surface of the pipe 102 and the warm humid air in the cavity 108 thereby preventing condensation.

It can therefore be seen that the present invention provides a method and system for effectively insulating piping located in an exterior wall construction in a manner that protects the piping from freezing. The insulation block reliably provides a thickness of insulation material behind the piping such that the insulation material is positioned between the piping and the exterior wall surface and the insulation maintains the piping in contact with the rear surface of the interior wall sheathing to facilitate heat transfer from the interior of the building and into the piping. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An insulation system for insulating piping contained in a ceiling structure having a plurality of adjacent framing members supporting interior sheathing on a lower surface thereof and at least one pipe on an upper surface thereof, said plurality of adjacent framing members and interior sheathing forming a space therebetween, said space having a warm side adjacent said interior sheathing the insulation system comprising:

at least one rigid insulation block having a proximal end, a distal end and front and rear surfaces extending along a length of said insulation block between said proximal and distal ends said length corresponding to a spacing between said plurality of adjacent framing members;

a cavity formed within said insulation block spaced at a distance from said front surface corresponding to a height of said plurality of adjacent framing members and extending along the length of said block from said proximal end to said distal end; and a wedge shaped slot having a wider opening at said front surface and extending to a narrower opening at said cavity, wherein said cavity receives said at least one pipe therein such that a portion of said at least one pipe is exposed adjacent said front surface of said insulation block, wherein heat passing through said ceiling structure is focused through said slot onto said at least one pipe.

2. The insulation system of claim 1, said space having a cold side, said insulation system being received within said space with said rear surface adjacent said cold side and said front surface adjacent said warm side.

3. The insulation system of claim 1, further comprising:

a continuous thermally conductive layer covering an interior surface of said cavity, said slot and at least a portion of said front surface of said block proximate said slot, said thermally conductive layer being in thermal communication with said interior sheathing.

4. The insulation system of claim 1, said at least one block further comprising a plurality of blocks having interfitting mating formations extending from said proximal and distal ends that interfit with corresponding formations on adjacent blocks and extend over said upper surface of said plurality of adjacent framing members when received in an installed position.

5. The insulation system of claim 1, further comprising a layer of insulation installed in said cavity beneath said at least one pipe to prevent condensation. b666

\* \* \* \* \*